(12) United States Patent
Alexander et al.

(10) Patent No.: US 6,601,176 B1
(45) Date of Patent: Jul. 29, 2003

(54) AUTOMOTIVE COMPUTER SYSTEM AND METHOD WHEREBY RESPONSIVE TO DETECTING ENGINE CRANKING MAIN PROCESSOR ENTERS A SUSPEND MODE AND CURRENT STATE OF DEVICES ARE STORED IN VOLATILE MEMORY

(75) Inventors: Douglas Alexander, South Lyon, MI (US); David P. Wright, Redford, MI (US); John Frank Konstantine, Dearborn, MI (US); Vincent Messina, Saline, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/392,146

(22) Filed: Sep. 8, 1999

(51) Int. Cl.$^7$ .............................. G06F 1/26; G06F 1/32; G06F 1/177

(52) U.S. Cl. ...................... 713/300; 713/320; 713/324; 713/323; 713/340; 713/330; 713/1

(58) Field of Search ........................... 713/1, 300, 330, 713/340, 320, 323, 324

(56) References Cited

U.S. PATENT DOCUMENTS

| | | | | |
|---|---|---|---|---|
| 4,787,040 A | * | 11/1988 | Ames et al. ................... 701/1 |
| 4,950,914 A | * | 8/1990 | Kurihara et al. ............ 307/10.1 |
| 5,072,597 A | * | 12/1991 | Bromley et al. .............. 62/209 |
| 5,375,247 A | * | 12/1994 | Hueser ...................... 395/750 |
| 5,385,126 A | | 1/1995 | Matthews |
| 5,498,217 A | * | 3/1996 | Maruyama et al. ......... 477/169 |
| 5,845,134 A | | 12/1998 | Arai |
| 5,850,559 A | | 12/1998 | Angelo et al. |
| 5,890,004 A | | 3/1999 | Poisner |
| 5,892,942 A | | 4/1999 | Ohnishi |
| 6,009,363 A | | 12/1999 | Beckert |
| 6,038,633 A | * | 3/2000 | Tavallaei .................... 710/262 |
| 6,189,107 B1 | * | 2/2001 | Kim et al. ................... 713/300 |
| 6,249,739 B1 | * | 6/2001 | Noehring et al. ........... 710/113 |

* cited by examiner

Primary Examiner—Thomas Lee
Assistant Examiner—James K. Trujillo (57) ABSTRACT

A multimedia/personal computer based system for operating information, communication, and entertainment devices in a mobile vehicle uses a power management system which provides power to volatile ram during engine startup. During engine startup, battery voltage decreases to a point that most electronic devices can not function and may be harmed. A low power microprocessor off-board of a main processor board, which is a complex instruction set (CISC) processor system, switches a primary voltage regulator, which provides a plurality of regulated voltages to the main processor board, off to reduce power requirements. The main processor board stores a state of predetermined peripheral devices in volatile ram and then turns the devices off. The main processor then goes into a suspend mode awaiting a wake up signal from the low power microprocessor. A secondary voltage regulator turns on to supply power to the volatile ram when the primary voltage regulator is turned off.

14 Claims, 5 Drawing Sheets

AUTOMOTIVE COMPUTER SYSTEM AND METHOD WHEREBY RESPONSIVE TO DETECTING ENGINE CRANKING MAIN PROCESSOR ENTERS A SUSPEND MODE AND CURRENT STATE OF DEVICES ARE STORED IN VOLATILE MEMORY

This application is related to U.S. application U.S. Ser. No. 09/353,684, filed Jul. 14, 1999, entitled "Power Managemnent Fault Strategy for Automotive Multimedia System," now U.S. Pat. No. 6,367,022 issued Apr. 2, 2002, and U.S. application Ser. 09/353,685, filed Jul. 14, 1999, entitled "Power Management for Automotive Multimedia System," now U.S. Pat. No. 6,393,573 issued May 21, 2002. Both applications are incorporated herein by reference.

BACKGROUND OF THE INVENTION

The present invention relates in general to a method and apparatus for providing power to an automotive multimedia/personal computer system, and, more specifically, to a system for providing power to volatile ram during engine startup.

Power management is an important issue in portable computing devices. This is especially true in mobile vehicles which have a limited battery capacity and stringent current limitations. As microprocessor-based systems become more powerful by using larger microprocessors and using a greater number of peripheral devices, power requirements increase. In vehicles containing an internal combustion engine and an alternator, electric power generation may be sufficient to operate without much difficulty. In vehicles using other power plants or in an internal combustion engine vehicle with the engine shut off, significant limitations may be placed on current consumption(both normal operating current and quiescent current) of the multimedia/PC system.

Power requirements within the vehicle are typically at their highest when starting the vehicle. A starter motor can require the entire power generating capacity of the battery thereby causing battery voltage to drop below a minimum required voltage for safe operation of electrical devices (known as a brown out condition). During this peak load time, electrical devices which are active could be damaged or lose critical data stored in volatile random access memory (RAM) as a result of the drop in battery voltage. The loss of the critical data can force a device to become nonfunctional or have to spend extra time reconfiguring to allow proper functioning.

In the past, electrical devices have used other power sources, such as a secondary battery, to overcome the loss of main battery voltage during engine startup. As the battery voltage is reduced, the secondary battery keeps a minimum voltage supplied to the device to allow continued function and no loss of stored data. A problem with this is the extra secondary battery can be expensive and extra space is needed for the storage of the secondary battery within the vehicle.

Electrical devices must be able to respond very quickly to power loss. The devices must be able to protect and save any critical data within milliseconds before the engine actually starts cranking and battery voltage drops. Current technology is limited because most multimedia/PC based systems use processors not equipped to shut down quickly or deal with a sudden loss in battery voltage.

SUMMARY OF THE INVENTION

The present invention has the advantage of providing an efficient and safe method of shutting down an in vehicle computer based system during engine start up while preserving the contents of volatile random access memory.

In one aspect of the invention, a power management system for providing energy to volatile ram in a processor based electronic system is installed in a vehicle having an engine. The vehicle includes an engine crank signal for detecting a startup condition of the engine and a main electrical power source. The system includes a main processor board for performing information processing. The main processor board includes an input for the engine crank signal and the main processor board is coupled to, or contains, the volatile ram.

The power management system also includes a vehicle input/output processor board for performing real time processing of vehicle interfaces, user inputs, and overall power management of a plurality of peripheral devices. The input/output processor board is coupled to the main processor board and also includes an input for the engine crank signal.

The power management system further includes a primary voltage regulator for powering the main processor board. The primary voltage regulator generates a primary regulated output voltage in response to a primary input voltage. The primary voltage regulator is also coupled to the input/output processor board and the main electrical power source.

The power management system further includes a secondary voltage regulator coupled to the volatile ram to provide power at least during startup of the engine. The secondary voltage regulator generates a secondary regulated output voltage in response to a secondary input voltage and is coupled to the main electrical power source.

The primary voltage regulator provides the primary regulated output voltage as long as the primary input voltage is within a primary voltage range. The secondary voltage regulator provides the secondary regulated output voltage as long as the secondary input voltage is within a secondary voltage range which contains voltages lower then the primary voltage range so that it can power the ram when the main power source voltage drops during cranking.

The main processor board detects the engine crank signal and goes into a suspend mode in which predetermined devices controlled by the main processor board are shut down. As the predetermined devices are shut down, the main processor board stores a current state of all devices controlled by the main processor board into the volatile memory for recall after the engine is started and the main power source voltage recovers.

DETAILED DESCRPITION OF PREFERRED EMBODIMENTS

Figure 1:
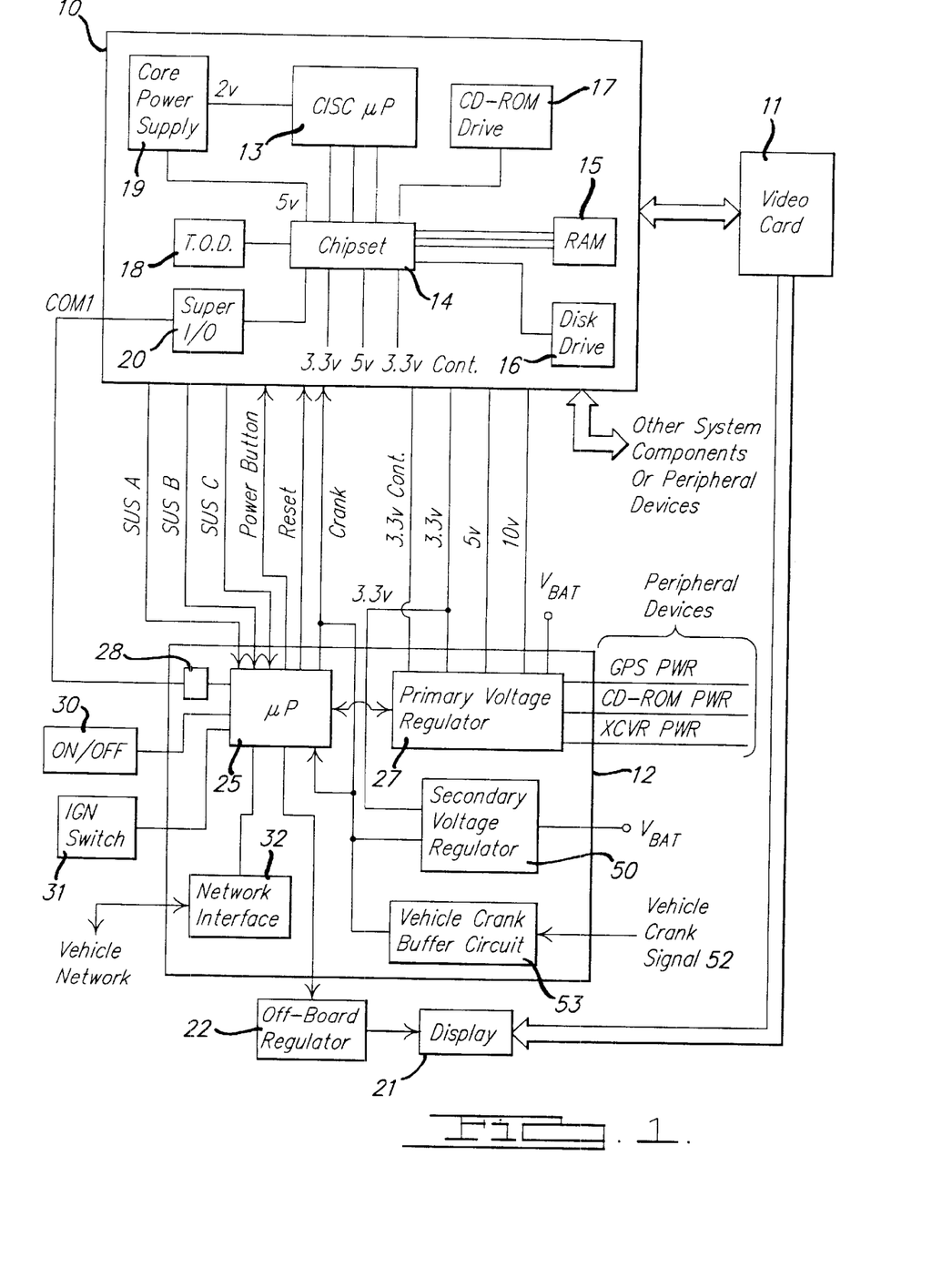
FIG. 1 is a block diagram showing a multimedia system employing the power management system of the present invention.
Figure 2A:
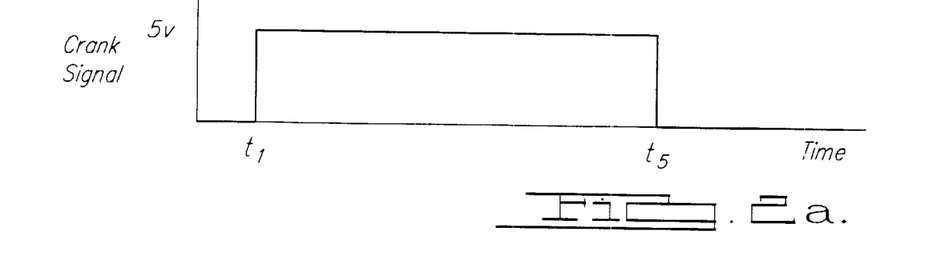
FIG. 2 is a timing diagram of the power management system.
Figure 2B:
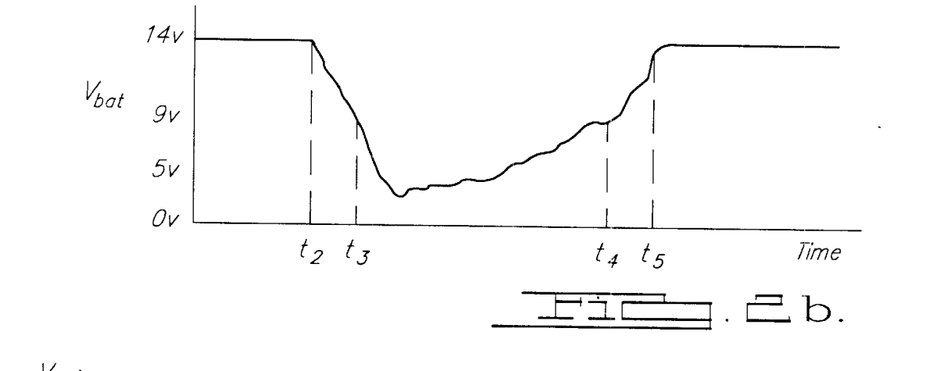
Figure 2C:
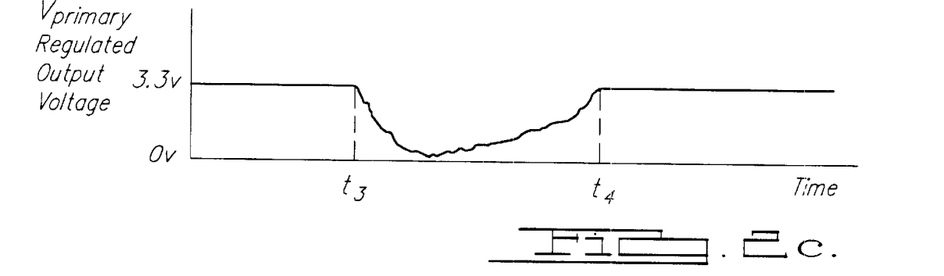
Figure 2D:
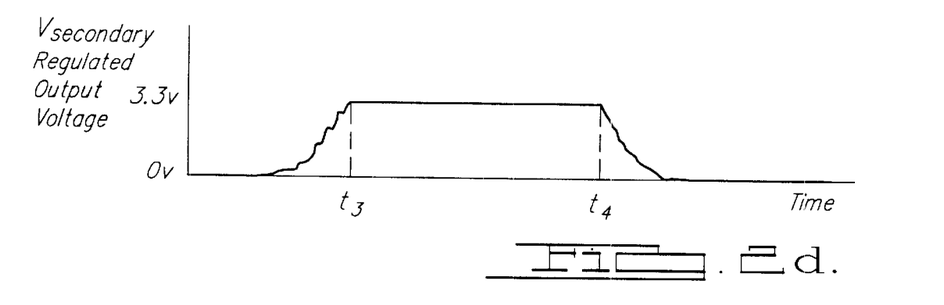

Referring to FIG. 1, a main processor board 10 is connected to a video processor card 11 and a vehicle input/ output processor board 12 (VIOP). Main processor board 10 includes a complex instruction set computing (CISC) processor 13 which may be comprised of an Intel Celleron processor, for example. A support chip set 14 is connected to processor 13 and is adapted to function specifically with microprocessor 13. Support chip set 14 may be one or more integrated circuits and may preferably be comprised of north and south portions of an Intel Banister Bridge.

Chip set 14 provides interfaces between processor 13 and various other devices and provides local power management for processor 13. Support chip set 14 includes a DRAM memory controller for controlling a DRAM memory 15. Chip set 14 also includes interface controllers for mass storage devices such as a hard drive 16 and a CD-ROM drive 17. Processor 13 is a main application processor and executes operating system software and application programs contained on hard drive 16 and/or CD-ROM drive 17.

A time of day (TOD) unit 18 is connected to chip set 14 and keeps track of time of day in a conventional manner. A low quiescent current regulator that operates off of the vehicle battery (not shown) is preferably provided to maintain operation of TOD unit 18 even when power is off to main processor board 10.

Chip set 14 receives several different regulated voltages from VIOP 12 as is described below. Chip set 14 helps control the regulated voltages to provide power to processor 13 and DRAM 15 according to its own, conventional power management strategy. Main processor board 10 may further include a core power supply 19 driven by chip set 14 to provide a regulated voltage at a value not being supplied by VIOP 12.

A super-input/output (I/O) interface 20 is connected to chip set 14 and provides a serial communications port COM1 which is connected to VIOP 12. The serial communications link carries messages between processor 13 and VIOP 12 relating to power management and to input and output data and control signals.

Main processor board 10 includes other conventional components which are peripheral devices and are not shown such as a BIOS unit and standard bus interfaces such as ISA, PCI, and USB interfaces. Video card 11 may be connected to a PCI expansion slot, for example. Video card 11 includes a video output connected to a display 21 which is powered by an off-board regulator 22 under control of VIOP 12.

VIOP 12 includes a reduced power microprocessor 25 which executes program instructions contained in a read-only memory, for example. Reduced power microprocessor 25 may be comprised of a Motorola 68 HC912 processor, for example, or other low power processor of the type often LLed on automotive applications. A principal job of processor 25 is to control a primary voltage regulator 27 which has a plurality of switched and unswitched primary regulated voltage outputs. For example, switched outputs of 3.3 v, 5 v, and 10 v are provided along with an unswitched (i.e. continuous) supply of 3.3 v. Each of these regulated voltages is provided to main processor board 10 and then distributed to various components which use them, including chip set 14. These voltages are used to operate microprocessor 13, power memory 15 for refreshing and accessing memory contents, and for powering portions of chip set 14 itself. In addition, power may he directly supplied to hard drive 16, CD-ROM 17 and TOD unit 18. Primary voltage regulator 27 should preferably function within a primary input voltage range of between about 9 v and 28 v at a main power input which receives main battery voltage Vbat.

Primary voltage regulator 27 may also provide regulated voltages to peripheral devices located remotely from main processor board 10 and VIOP 12. For example, a separate, remote module may include a GPS receiver and a wireless data transceiver, each receiving GPS power (GPS PWR) and transceiver power (XCVR PWR), respectively, from primary voltage regulator 27.

VIOP 12 includes a secondary voltage regulator 50 which is coupled to ram 15 on main processor board 10. Secondary voltage regulator 50 operates within a secondary input voltage range (Vbat) between 4 v and 28v, but should always be able to function during cranking of the engine. Secondary voltage regulator 50 can be in parallel with primary voltage regulator 27 or it can be directly connected to ram 15 on main processor board 10. A primary function of secondary regulator 50 is to provide a secondary regulated voltage output to ram 15 of 3.3 volts to maintain memory contents during engine start up.

Secondary voltage regulator 50 can be activated in multiple fashions. In the preferred embodiment, secondary voltage regulator 50 automatically activates when battery voltage (Vbat) drops below the primary input voltage range minimum of primary voltage regulator 27, (i.e., below 9 v). Another way of activating secondary voltage regulator 50 is to switch it on and off under direct control of a vehicle crank signal 52. Vehicle crank signal 52 can be generated by an engine controller or by an ignition switch. Another way of activating secondary voltage regulator 50 is to always power the regulator as a constant power source for ram 15. Activating secondary voltage regulator 50 in this fashion insures ram 15 will not lose power, but it is wasteful of power when the system is in normal operation due to the fact that primary voltage regulator 27 is already powering ram 15.

FIG. 2 shows the timing relationship for the preferred embodiment between battery voltage (Vbat), primary voltage regulator 27, and secondary voltage regulator 50. Vehicle crank signal 52 transitions to an on state at time t1 as shown in FIG. 2a. At time t2 the engine starts to crank and the main battery voltage declines as shown in FIG. 2b. There is a delay between crank signal 52 and actual cranking of the engine, time t1 to time t2, caused by the building of current sufficient to engage a starter solenoid which energizes the starter motor and cranks the engine. As the main battery voltage declines during cranking, the primary regulated voltage output of primary voltage regulator 27 falls below its minimum rating at a time t3 (FIG. 2c), and the secondary regulated voltage output simultaneously climbs to 3.3 v (FIG. 2d) in order to maintain the ram contents. As the main battery voltage increases after the engine starts, the primary regulated output voltage will increase to its proper rated output voltage at a time t4, while the secondary regulated output voltage declines to a minimum.

VIOP 12 includes a physical interface 28 for providing a serial port connection for microprocessor 25 to communicate with the COM1 port of the main processor board 10 and microprocessor 25. Microprocessor 25 provides a power button signal in response to an on/off switch 30 controlled by the user to indicate when to place the multimedia system in an in-use condition, and a reset signal for causing the main application processor 13 to reboot. Chip set 14 provides three distinct signals SUS A, SUS B, and SUS C, which identify the suspended power state in which the power management strategy of chip set 14 is operating.

Microprocessor 25 also receives a signal from an ignition switch 31 to identify whether the vehicle is in a powered state or an unpowered state. Based upon the state of ignition switch 31 and on/off switch 30, microprocessor and microprocessor 13 each determine an appropriate power state for main application processor 13 and chip set 14. Depending upon the current state and next desired state of microprocessor 13 and chip set 14, microprocessor 25 may merely verify that the correct state has been implemented by chip set 14, it may command a different state over the serial communication link, or it may switch the state of primary voltage regulator 27 to provide different regulated voltages to the main processor board 10. Also based upon the state of various switches or other inputs, microprocessor 25 may control the switching on and off of off-board regulator 22 for powering display 21 as appropriate.

Microprocessor 25 and microprocessor 13 also receive vehicle crank signal 52 which can be generated by either an engine control processor or ignition switch 31. Vehicle crank signal 52 identifies that the operator is attempting to start the engine. The main battery voltage does not drop until the starter motor actually begins turning, (e.g., about 14 ms after turning the ignition switch to the start position). Vehicle crank signal 52 is processed by a vehicle crank signal buffer circuit 53 which converts vehicle crank signal 52 into a signal microprocessor 25 can use, such as a 0 to 5 volt TTL level signal. After vehicle crank signal 52 is received by microprocessor 25 it is immediately transmitted to microprocessor 13 on main processor board 10. Vehicle crank signal 52 causes microprocessor 25 to go into a low power mode and microprocessor 13 to go into a suspend mode. The low power mode is characterized by the following conditions: all devices controlled or located on VIOP board 12 are shut down, including all switched voltages from primary voltage regulator 27, and microprocessor 25 is in a wait mode wherein microprocessor 25 monitors vehicle crank signal 52 until the signal transitions into an off state, (i.e., cranking has terminated), which allows microprocessor 25 to resume normal operations. The suspend mode of microprocessor 13 is characterized by the following conditions: predetermined devices, such as peripheral devices, CD ROM drive, disk drives etc., are shut down and microprocessor 13 and chip set 14 are in a suspend state, e.g., a S3 or suspend to ram state as defined in the ACPI spec.

Figure 3:
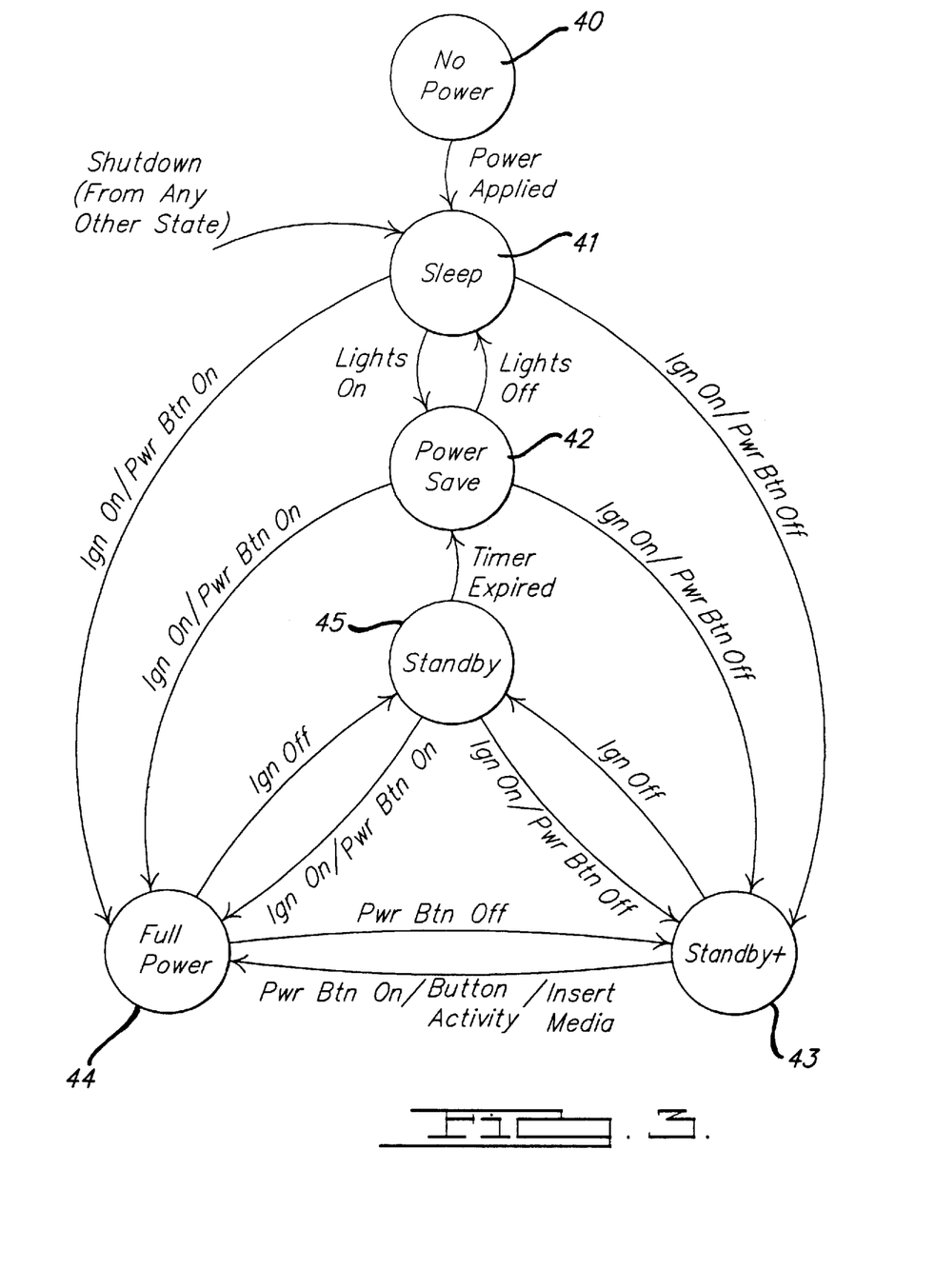
FIG. 3 is a state diagram showing state transitions of the system in FIG. 1.

Operation of the power management strategy for the multimedia system will be described in connection with the state diagram of FIG. 3. Prior to application of any power, the multimedia system is in No Power state 40. In No Power state 40, main battery power is disconnected and all units are off. Once power is applied, the multimedia system transitions to a Sleep state 41. Sleep state 41 is characterized by the following conditions: ignition is off, the VIOP unit is asleep, the main microprocessor and chip set are off, the display is off, remote wireless and GPS units are off, CD-ROM unit is off, and display backlighting is off (backlighting refers to background lighting of an LCD display and is desirable to provide general panel lighting of a vehicle dashboard during low light conditions even though the unit itself is off). During Sleep state 41, if the vehicle external lights such as headlights are turned on, then it is desirable to supply backlighting power for the display. Thus, a lights-on condition triggers a transition to a Power Save state 42 in which the VIOP unit is awake and can control backlighting power to the display. When the lights then go off, a transition is made to return to Sleep state 41.

When the vehicle ignition turns on, a transition will be made out of Sleep state 41 depending upon the status of the on/off power button on the multimedia unit itself. If the power button is off, then a transition is made to Standby+ state 43. If the power button is on, then a transition is made to Full Power state 44.

Transition may be made to Sleep state 41 from any other state during a shutdown caused by an error or lock-up condition of the main microprocessor causing it to fail to respond to VIOP messages. In that case, the VIOP processor shuts down all switched power to main motherboard 10 thereby initiating Sleep state 41.

Power Save state 42 is characterized by the following conditions: ignition is off, VIOP unit is awake, main application processor and chip set are asleep in a suspend-to-disk state (referred to as a D3 state for an Intel Celleron chipset/ACPI spec), the display is off, wireless and GPS transceivers are off, CD-ROM unit is off, and display backlighting may or may not be on depending upon other vehicle settings (e.g., headlights). When the vehicle ignition turns on, a transition will be made out of Power Save state 42 depending upon the status of the on/off power button on the multimedia unit itself. If the power button is off, then a transition is made to Standby+ state 43. If the power button is on, then a transition is made to Full Power state 44. Standby+ state 43 is characterized by the following conditions: ignition is on, VIOP unit is awake, main processor and chip set are on, display is off, wireless data transceiver is off, GPS unit is on, CD-ROM unit is off, and backlighting of the display is dependent on other lamp states. While in Standby+ state 43, a transition may be made to Full Power state 44 in response to the turning on of the power button, activity on any other button controls of the multimedia system as appropriate, or the insertion of a media such as a CD audio disc. If the ignition switch is turned off while in Standby+ state 43, a transition is made to Standby state 45.

Standby state 45 is characterized by the following conditions: ignition is off, VIOP unit is awake, the main processor and chip set are asleep in the suspend-to-RAM state (designated as state S3 in the Intel Celleron power management strategy), display is off, wireless transceiver and GPS receiver are off, CD-ROM unit is off, and display backlighting depends upon vehicle lamps. When in Standby state 45, a fairly low quiescent current consumption of about 100 mA may be obtained. Although this current draw is fairly low, it is higher than can be maintained for extremely long periods in a vehicle which must rely on its main battery for starting the vehicle internal combustion engine. Therefore, Standby state 45 includes operating of the time of day timer in order to detect a predetermined period of time, after which a transition is made to Power Save state 42. In Power Save state 42, the main processor and chip set switch to the suspend-to-disk condition and since the DRAM memory does not need to be continuously refreshed, the power consumption may drop to about 4 mA.

Operation of the power management system for the multimedia system during and after a crank event will be described in connection with the flowcharts of FIGS. 4 and 5. When vehicle crank signal 52 is received by microprocessor 25 the signal is immediately transmitted to main processor board 10 in step 54. VIOP board 12, in the preferred embodiment, is responsible for transmitting vehicle crank signal 52 to main processor board 10. Vehicle crank signal 52 can be transmitted via a dedicated line or by using one of the already present communication lines between the boards. After vehicle crank signal 52 has been transmitted to main processor board 10, VIOP microprocessor 25 must check in step 56 to see if it was in a wake-up mode. The wake up mode is characterized by the following conditions: microprocessor 25 is sending wake up signals to main processor board 10 to indicate to main processor board 10 to begin normal operations. If microprocessor 25 is in the wake-up mode when vehicle crank signal 52 is received then microprocessor 25 must save a current state of microprocessor 25 into on board ram in step 58. The saved state refers to a last performed action of microprocessor 25 while in the wake up mode. This allows for microprocessor 25 to suspend the wake up of microprocessor 13 while keeping the processor 13 in a low power mode for the duration of the crank, and to continue where it left off when crank signal 52 terminates. In many cases this state will not allow microprocessor 25 to start where it left off, but in the event the state is a good starting point, the transition time required to have a successful wake up will be reduced. If microprocessor 25 was not in a wake up mode when vehicle crank signal 52 was received or once microprocessor 25 is finished saving the state in step 58 then microprocessor 25 will enter a low power mode in step 60. The low power mode is characterized by the following conditions: primary voltage regulator 27 is off except for the continuous or unswitched voltages; microprocessor 25 is asleep, i.e., no processor functioning, but awaiting vehicle crank signal 52 to terminate; all peripheral devices are shut down; and any other device controlled by microprocessor 25 is also shut down.

After vehicle crank signal 52 terminates (e.g., the ignition switch returns to the run position), VIOP microprocessor 25 looks in step 62 to see if it was in a wake up mode when vehicle crank signal 52 was received. If microprocessor 25 was in a wake up mode, the saved state is retrieved in step 64 and the wake up process is resumed from the saved state if appropriate. If microprocessor 25 was not in wake up mode, then a normal wake up mode is initiated in step 66 by sending the wake up mode signals to main processor board 10.

Figure 4:
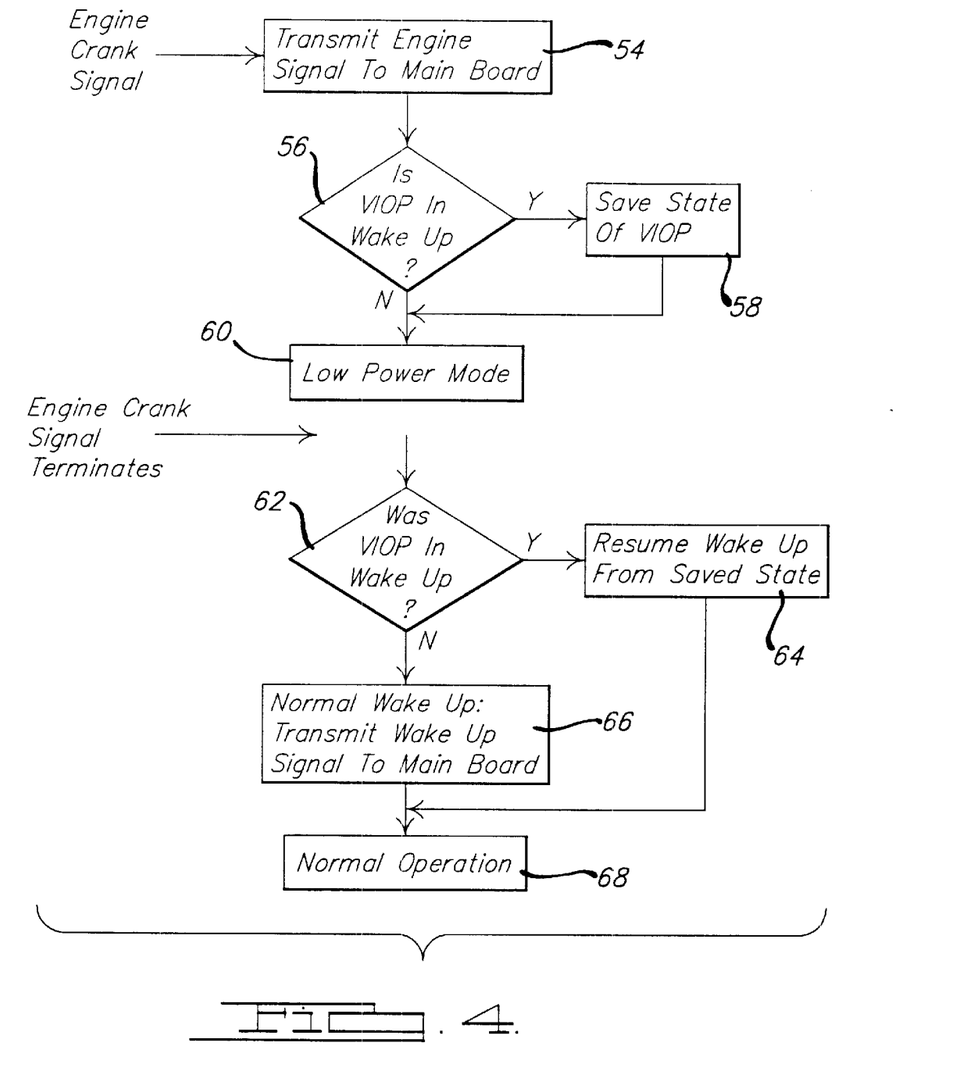
FIG. 4 is a flowchart describing the operation of the vehicle input/output processor board.
Figure 5:
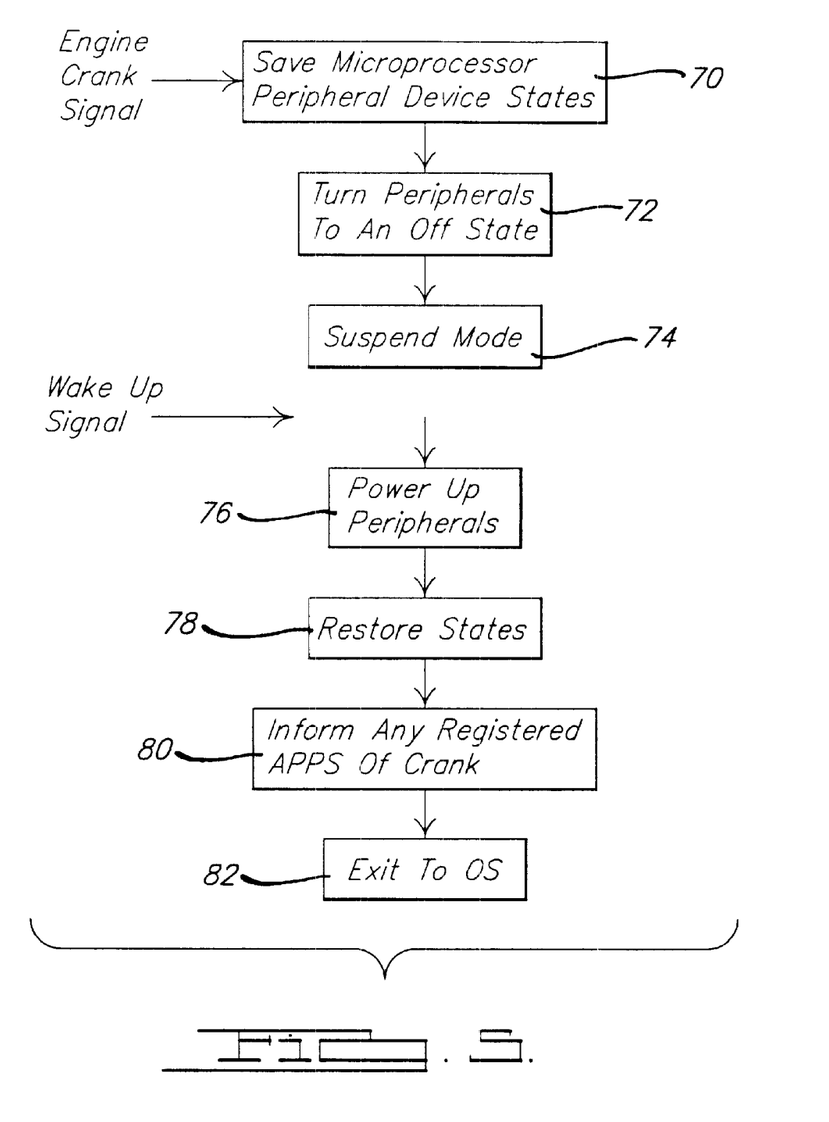
FIG. 5 is a flowchart describing the operation of the main processor board.

Referring to FIG. 4, after receiving crank signal 52, main board microprocessor 13 immediately saves a current state of each predetermined peripheral device it controls into ram 15 in step 70. The predetermined devices is are chosen based on an ability of the device to be shut down in a relatively short amount of time (e.g., a PCI interface may take very little time to save a state and shut down), amount of current consumption, and their importance to the overall multimedia system (i.e., devices which have a high importance to the functionality of the system). Some peripheral devices will not be able to have their state saved due to time constraints. The devices will still be shut down, but will be notified later that a power loss occurred. This should enable the device to respond appropriately when power is restored. After the device states are saved, the main board turns the peripheral devices to an off state in step 72. Turning the devices to an off state allows for a lower power requirement and protects the devices from the brown out condition described above. After powering down the devices, microprocessor 13 transitions into a suspend mode in step 74. Suspend mode is characterized by the following conditions: crank signal 52 is on, the main processor board's microprocessor 13 is asleep in the suspend-to-RAM state (designated as state S3 in the ACPI spec), all peripheral devices are off, the CD-ROM drive 17 is off, and the Disk Drive 16 is off.

Main processor board 10 stays in the suspend mode until VIOP 12 board sends a wake up command sequence. When the wake up command sequence is received by main processor board 10, microprocessor 13 transitions into one of its normal operating states as appropriate, i.e. standby state, power save state, etc. Upon wake up in step 76, the peripheral devices are again powered. All saved states are restored in step 78. Any other device or other system application which did not have its state saved or needs to know that a shut down has previously occurred are notified of the previous shut down in step 80. The microprocessor 13 then exits to normal operations which is controlled by an operating system normally found on the Intel Celleron processors in step 82.

What is claimed is:

1. A power management system for providing energy to volatile ram in a processor based electronic system installed in a vehicle having an engine, said vehicle including an engine crank signal for detecting a startup condition of said engine and having a main electrical power source, said power management system comprising:

a main processor board for performing information processing including an input for said engine crank signal and a main processor coupled to said volatile ram;

a vehicle input/output processor board for performing real time processing of vehicle interfaces, user inputs, and overall power management of a plurality of peripheral devices, said input/output processor board being coupled to said main processor board and including an input for said engine crank signal;

a primary voltage regulator for powering said main processor board and generating a primary regulated output votage in response to a primary input voltage, said primary voltage regulator being coupled to said input/output processor board and being coupled to said main electrical power source; and a secondary voltage regulator coupled to said volatile ram and responsive to said engine crank signal to provide power substantially only during startup of said engine, said secondary voltage regulator generating a secondary regulated output voltage in response to a secondary input voltage and being coupled to said main electrical power source;

wherein said primary voltage regulator provides said primary regulated output voltage when said primary input voltage is within a primary voltage range;

wherein said secondary voltage regulator provides said secondary regulated output voltage when said secondary input voltage is within a secondary voltage range and wherein said secondary voltage range includes voltages lower than said primary voltage range; and wherein said main processor board detects said engine crank signal and enters into a suspend mode in which predetermined devices controlled by said main processor board are shut down and in which said main processor board stores a current state of said predetermined devices into said volatile ram.

2. The system according to claim 1 wherein said vehicle input/output processor board monitors said engine crank signal and wherein said vehicle input/output board sends a wake up signal to said main processor board after said vehicle input/output processor board detects said engine crank signal has transitioned to an off state.

3. The system according to claim 1 wherein said engine crank signal is transmitted from an engine control processor.

4. The system according to claim 1 wherein said secondary voltage regulator is directly connected to said volatile ram and is located on said vehicle input/output processor board.

5. The system according to claim 1 wherein said secondary voltage regulator is in parallel with said primary voltage regulator and wherein said primary voltage range is greater than about 9 v and said secondary voltage range is greater than about 4 v.

6. The system according to claim 1 wherein said main processor board completes entry into said suspend mode within about 14 ms of receiving said engine crank signal.

7. The system according to claim 1 wherein said secondary voltage regulator powers said volatile ram on said main processor board only after said primary voltage regulator shuts down due to reduced power availability during said engine startup condition.

8. A method of providing energy to volatile ram in a processor based electronic system installed in a vehicle with an engine and a main electrical power source, said vehicle including a vehicle ignition system which generates an engine crank signal when said engine is starting, said electronic system including a main processor board, a vehicle input/output processor board which generates a wake up signal when said engine crank signal transitions to an off state, a secondary voltage regulator and a primary voltage regulator both being coupled to said ram, said method comprising the steps of:

generating said engine crank signal in response to an operator requesting engine cranking;

entering a suspend mode in said main processor board in response to said engine cranking signal;

cranking said engine thereby reducing available power from said main electrical power source and causing said primary voltage regulator to shut down; and powering said secondary voltage regulator during engine cranking wherein said secondary voltage regulator powers said volatile ram, said secondary voltage regulator adapted to sustain said volatile ram when said available power is insufficient to maintain operation of said primary voltage regulator.

9. The method according to claim 8 wherein said vehicle input/output processor board transmits said wake up signal to said main processor board after detecting said crank signal transition to said off state where upon said main processor board resumes a normal operating state.

10. A power management system for providing energy to volatile ram in a processor based electronic system installed in a vehicle having an engine, said vehicle including an engine crank signal for detecting a startup condition of said engine and having a main electrical power source, said power management system comprising:

a main processor board for performing information processing including an input for said engine crank signal and a main processor coupled to said volatile ram;

a vehicle input/output processor board for performing real time processing of vehicle interfaces, user inputs, and overall power management of a plurality of peripheral devices, said input/output processor board being coupled to said main processor board and including an input for said engine crank signal;

a primary voltage regulator for powering said main processor board and generating a primary regulated output voltage in response to a primary input voltage, said primary voltage regulator being coupled to said input/output processor board and being coupled to said main electrical power source; and a secondary voltage regulator coupled to said volatile ram and responsive to said engine crank signal to provide power substantially only during startup of said engine, said secondary voltage regulator generating a secondary regulated output voltage in response to a secondary input voltage and being coupled to said mnain electrical power source;

wherein said primary voltage regulator provides said primary regulated output voltage when said primary input voltage is within a primary voltage range; and wherein said secondary voltage regulator provides said secondary regulated output voltage when said secondary input voltage is within a secondary voltage range and wherein said secondary voltage range includes voltages lower than said primary voltage range.

11. A power management system for providing energy to volatile ram in a processor based electronic system installed in a vehicle having an engine, said vehicle including an engine crank signal for detecting a startup condition of said engine and having a main electrical power source, said power management system comprising:

a main processor board for performing information processing including an input for said engine crank signal and a main processor coupled to said volatile ram; and a vehicle input/output processor board for performing real time processing of vehicle interfaces, user inputs, and overall power management of a plurality of peripheral devices, said input/output processor board being coupled to said main processor board and including an input for said engine crank signal;

wherein said main processor board detects said engine crank signal and enters into a suspend mode in which predetermined devices controlled by said main processor board are shut down and in which said main processor board stores a current state of said predetermined devices into said volatile ram.

12. A method of providing energy to volatile ram in a processor based electronic system installed in a vehicle with an engine and a main electrical power source, said vehicle including a vehicle ignition system which generates an engine crank signal when said engine is starting, said electronic system including a main processor board, a vehicle input/output processor board which generates a wake up signal when said engine crank signal transitions to an off state, a secondary voltage regulator and a primary voltage regulator both being coupled to said ram, said method comprising the steps of:

generating said engine crank signal in response to an operator requesting engine cranking;

cranking said engine thereby reducing available power from said main electrical power source and causing said primary voltage regulator to shut down; and powering said secondary voltage regulator during engine cranking wherein said secondary voltage regulator powers said volatile ram, said secondary voltage regulator adapted to sustain said volatile ram when said available power is insufficient to maintain operation of said primary voltage regulator.

13. A method of operating a processor based electronic system installed in a vehicle with an engine and a main electrical power source, said vehicle including a vehicle ignition system which generates an engine crank signal when said engine is starting, said electronic system including a main processor board having a main processor, and said electronic system including a vehicle input/output processor board which generates a wake up signal when said engine crank signal transitions to an off state, said method comprising the steps of:

generating said engine crank signal in response to an operator requesting engine cranking;

entering a suspend mode of said main processor in response to said engine cranking signal wherein predetimined devices controlled by said main processor board are shut down and wherein a current state of said predetermined devices are stored into a volatile memory.

14. A power management system for providing energy to volatile ram in a processor based electronic system installed in a vehicle having in engine, said vehicle including an engine crank signal for detecting a startup condition of said engine and having a main electrical power source, said power management system comprisings.

a main processor board for performing information processing including an input for said engine crank signal and a main processor coupled to said volatile ram;

a vehicle input/output processor board for performing real time processing of vehicle interfaces, user inputs, and overall power management of a plurality of peripheral devices, said input/output processor board being coupled to said main processor board and including an input for said engine crank signal;

a primary voltage regulator for powering said main processor board and generating a primary regulated output voltage in response to a primary input voltage, said primary voltage regulator being coupled to said input/output processor board and being coupled to said main electrical power source; and a secondary voltage regulator coupled to said volatile ram to provide power substantially only during startup of said engine, said secondary voltage regulator generating a secondary regulated output voltage in response to a secondary input voltage and being coupled to said main electrical power source;

wherein said primary voltage regulator provides said primary regulated output voltage when said primary input voltage is within a first voltage range, said primary input voltage falling below said first voltage range during said engine crank signal;

wherein said secondary voltage regulator is activated and provides power to said volatile ram after receiving said engine crank signal; and wherein said main processor board detects said engine crank signal and goes into a suspend mode in which predetermined devices controlled by said main processor board are shut down and in which said main processor board stores a current state of said predetermined devices into said volatile memory ram.

* * * * *